(12) United States Patent
Stewart

(10) Patent No.: US 8,311,585 B2
(45) Date of Patent: Nov. 13, 2012

(54) SYNCHRONIZED HELPER SYSTEM USING PAIRED COMPUTING DEVICE

(75) Inventor: Kam Stewart, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1416 days.

(21) Appl. No.: 11/864,411

(22) Filed: Sep. 28, 2007

(65) Prior Publication Data

US 2009/0088197 A1 Apr. 2, 2009

(51) Int. Cl.
*H04M 1/00* (2006.01)
(52) U.S. Cl. ........................ 455/566; 455/558
(58) Field of Classification Search .............. 455/412.1, 455/418, 41.2, 552.1, 419, 558, 420, 557, 455/550.1, 574; 370/328, 278, 338; 379/37; 709/219, 224, 218
See application file for complete search history.

(56) References Cited

U.S. PATENT DOCUMENTS

| 7,769,409 | B2 * | 8/2010 | Harris et al. ................. 455/558 |
| 8,019,622 | B2 * | 9/2011 | Kaboff et al. ..................... 705/2 |
| 2003/0134625 | A1 * | 7/2003 | Choi ............................ 455/418 |
| 2005/0232190 | A1 * | 10/2005 | Karaoguz et al. ............. 370/328 |
| 2005/0288006 | A1 * | 12/2005 | Apfel ............................ 455/418 |
| 2007/0172035 | A1 * | 7/2007 | Sussman et al. ................ 379/37 |
| 2008/0014984 | A1 * | 1/2008 | Brown et al. ............. 455/552.1 |

* cited by examiner

*Primary Examiner* — Kiet Doan

(57) ABSTRACT

A helper system uses a computing device paired with a mobile computing device to provide help information associated with operation of the mobile computing device. The mobile computing device and the paired computing devices are synchronized so that the help information relevant to the current status of the mobile computing device is provided by the paired computing device. By providing the help information on the paired computing device, the user may conveniently access the user information without interrupting the use of application program running on the mobile computing device.

19 Claims, 8 Drawing Sheets

SYNCHRONIZED HELPER SYSTEM USING PAIRED COMPUTING DEVICE

BACKGROUND

The present disclosure relates generally to providing help information associated with operating a mobile computing device, specifically to providing help information for a mobile computing device on another computing device paired with the mobile computing device and for allowing remote control and configuration of application programs on the mobile computing device.

As computing devices become more complex, more users are relying on various sources of help information to properly operate the computing devices. One way of providing help information for operating the computing devices is manuals in the form of paper documents. The paper manuals are advantageous in that the user may conveniently access the help information without interrupting the operation of the computing device. It is, however, difficult to search and find the necessary help information in paper manuals. Further, the paper manuals are bulky and difficult to carry around.

Another way of providing the help information for operating the computing devices is on-device helper systems. The on-device helper systems are programs executable on the computing device to search, locate and display the help information as requested by the user. The on-device helper systems have the advantage that the help information is always available on the computing device. The on-device helper systems, however, must display the help information on the same display module of the computing device. Because the screen is occupied by the help windows or help menus of the on-device helper systems, the user must switch between the on-device helper systems and the application program several times before properly operating the application program. Therefore, the display of the help information interrupts the user from using the application program. The on-device helper systems are especially problematic in mobile computing devices because the mobile computing devices generally have small screen sizes. Therefore, only a limited amount of help information can be displayed on the mobile computing device, and the user often has to scroll the screens or open new windows to obtain all of the necessary help information.

Some computing devices or application programs provide contextual helper system. The contextual helper system refers to a mechanism that allows the user to retrieve the help information of an application program by selecting a help icon or pull-down menu from a window or a screen associated with the application program. The contextual helper system obviates the step of searching and finding the correct help information because the relevant help information is identified from the window or screen currently being displayed on the computing device. The contextual helper system, however, tends to be less comprehensive. The contextual help information also has the same disadvantage as the on-device helper systems: that is, the help windows or help menus occupy the screen of the computing device, and interrupts the user from operating the application program.

Another way of providing the help information is using a web helper system. The web helper system generally employs a browser to search and retrieve help information from a remote server. The web helper system is advantageous in that its help information is generally up to date and is comprehensive. The web helper system, however, requires online access to obtain the help information. The web helper system also has the same disadvantage as the on-device helper systems and the contextual helper system: the browser occupies the screen, and interrupts the user from operating the application program.

Therefore, among other deficiencies, the present art lacks helper system providing contextual help information related to a mobile computing device to the user without interrupting the user's operation of the application program running on the mobile computing device.

SUMMARY

Embodiments disclosed provide a helper system and method for a mobile computing device that operates in conjunction with a paired computing device. Status data representing the status of the user interface module of the mobile computing device is communicated to the paired computing device. Using the status data, the paired computing device may display on its display device help information synchronized with the status of the user interface module of the mobile computing device.

In one embodiment, the status data comprises screen identification data for identifying screen images displayed on the display module of the mobile computing device. Using the status data, the paired computing device may determine the status of the mobile computing device or an application program running on the mobile computing device and provide the help information that is synchronized with the current status of the application program.

In one embodiment, the paired computing device receives user inputs associated with the help information displayed on the paired computing device, and sends the user inputs to the mobile computing device. The mobile computing device may have user interface modules such as small keypads or touch screens that are inconvenient for the users to input a large amount of information. The paired computing device may have full keyboard or other user interface modules that allow users to input information more conveniently and efficiently compared to the user interface modules of the mobile computing device. The users may, therefore, use the user interface modules on the paired computing device displaying the help information, to input the information back to the mobile computing device.

In one embodiment, the paired computing device searches for the help information associated with the status data on its help information storage. Responsive to not finding the relevant help information on its help information storage or determining that the stored help information is outdated, the paired computing device may search and retrieve the relevant help information from a remote server.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

Embodiments disclosed can be readily understood by considering the following detailed description in conjunction with the accompanying drawings.

DETAILED DESCRIPTION OF EMBODIMENTS

Figure 1:
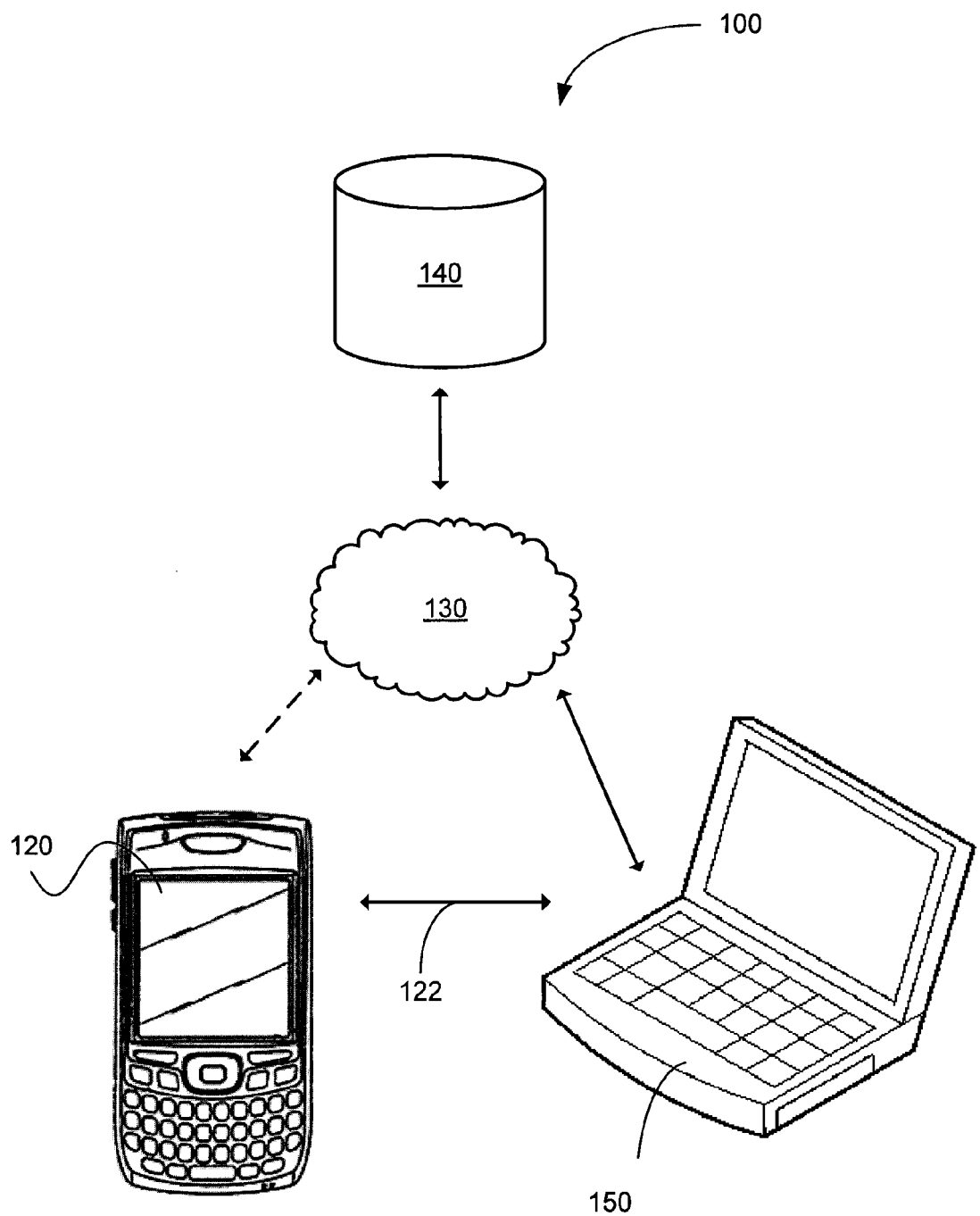
FIG. 1 is a schematic diagram illustrating a helper system architecture, according to one embodiment.

A helper system is provided that uses a computing device paired with a mobile computing device to provide help information associated with the mobile computing device. The mobile computing device and the paired computing devices are synchronized so the help information relevant to the current status of the mobile computing device is displayed on the paired computing device. By providing the help information on the paired computing device, the user may conveniently access the user information without interrupting the use of the application program running on the mobile computing device. The large screen of the paired computing device also allows more detailed help information or screen shots of the mobile computing device to be displayed so that the user may conveniently follow the instructions of the help information. The large screen of the paired computing device may also display user input fields (e.g., text boxes or pull-down menus) that allow the user to conveniently provide user inputs associated with the mobile computing device using the user interface modules of the paired computing device.

A mobile computing device refers to any portable computing device having computing capabilities. The mobile computing device may be devices including, among other devices, a smartphone, a personal digital assistant (PDA), a game console, an MP3 player, and a mobile phone. The mobile computing device may also be referenced as a mobile client device or handheld computing device.

A paired computing device is a computing device that has a trust relationship with a mobile computing device. The trust relationship may be established by sharing a security code (e.g., passkey in Bluetooth connections) between the mobile computing device and the paired computing device. It is also possible to use technology other than Bluetooth connection to establish the trust relationship. The mobile computing device and the paired computing device may also be configured to recognize or detect each other's presence or proximity. The paired computing device may establish a synchronous communication session with the mobile computing device after receiving a request from the mobile computing device, or may perform persistent or continuous synchronization with the mobile computing device.

Status data refers to data representing the status of the user interface module of the mobile computing device. The status data may include, among other data, screen identification data and dynamic status data of the application programs or the mobile computing device. An application program may display more than one type of screen images depending upon the various states of the application program running on the mobile computing device as well as the relevant user input and other various settings of the application program or the mobile computing device. The screen identification data identifies the states of the application program by identifying the screen being displayed on the mobile computing device. The status dynamic data indicates the current status of the application program or the mobile computing device. For example, the dynamic data may indicate the state of the application program (e.g., setup state or operating state), resources of the mobile computing device currently available (e.g., remaining memory space or remaining battery life) or the identification of current application programs currently running on the mobile computing device.

Example Helper System Architecture

FIG. 1 is a schematic diagram illustrating a helper system architecture, according to one embodiment. The helper system 100 comprises, among other components, a mobile computing device 120, a paired computing device 150 (paired with the mobile computing device 120), a network 130, and a remote server 140. The mobile computing device 120 communicates with the paired computing device 150 via a communication channel 122.

In one embodiment, the paired computing device 150 is a companion device of the mobile computing device 120. The companion device may include a software daemon running on the background to instantly turn "on" the companion device (i.e., no boot-up time is needed for operation) based on the communication with the mobile computing device 120.

The mobile computing device 120 and the paired computing device 150 have a trust relationship that allows both devices 120, 150 to synchronize and exchange data. The trust relationship between the two devices 120, 150 may be implemented using the technique, for examples, as disclosed in U.S. patent application Ser. No. 11/610,949 filed on Dec. 14, 2006, entitled "System and Method for Implementing Security Features and Policies Between Paired Computing Devices," which is incorporated herein by reference in its entirety.

In one embodiment, the communication channel 122 between the mobile computing device 120 and the paired computing device 150 is established using technology such as Bluetooth technology, Wireless Fidelity (Wi-Fi), Worldwide Interoperability for Microwave Access (WiMAX), HTTP protocols, IP telephony and Universal Serial Bus (USB). The mobile computing device 120 and the paired computing device 150 communicate, among other data, the status data. The paired computing device 150 receives the status data, and displays on the paired computing device 150 the help information relevant to the current status of the mobile computing device 120.

In one embodiment, the remote server 140 stores, among other data, the help information associated with the operation of the mobile computing device 120. The paired computing device 150 communicates with the remote server 140 to newly receive or update the help information stored on the paired computing device 150, as described below with reference to FIG. 5A. The remote server 140 may also communicate with the mobile computing device 120 via the network 130 to perform various operations such as backing up the user data of the mobile computing device 120.

Example Mobile Computing Device Architecture

Figure 2:
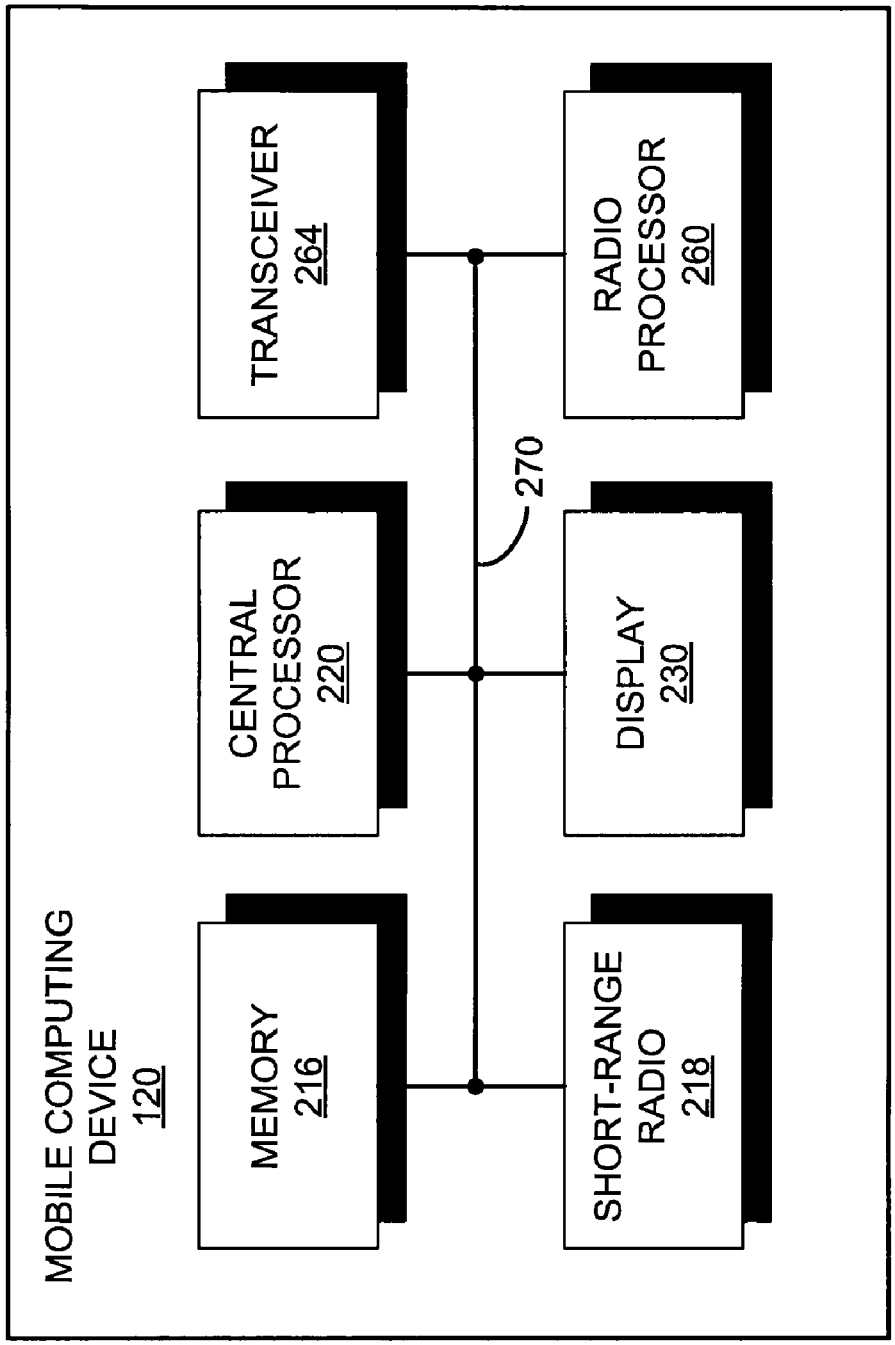
FIG. 2 is a block diagram illustrating a mobile computing device, according to one embodiment.

FIG. 2 is a block diagram illustrating the mobile computing device 120, according to one embodiment. The mobile computing device 120 in this embodiment is a smartphone including, among other components, a memory module 216, a central processor 220, a transceiver 264, a short-range radio module 218, a display module 230, and a radio processor 260. In one embodiment, these components communicate with each other using a bus 270. Each component of the mobile computing device 120, whether alone or in combination with other components, may be implemented for example, in software, hardware, firmware or any other combination thereof.

The memory module 216 (or other tangible computer readable medium) stores program codes (e.g., instructions) to be executed by the central processor 220 including, but not limited to, data associated with application programs operable on the mobile computing device 120. The memory module 216 may be a non-volatile type persistent memory such as a hard disk, a compact flash, or an EEPROM. The memory module 216 may also be a volatile type such as a random access memory, a buffer, a cache, a register, a combination of non-volatile and volatile memory, or other device capable of storing instructions and data.

The central processor 220 performs various operations according to the program codes stored in the memory module 216. The operations performed include, among other instructions, controlling of other components in the mobile computing device 120.

The transceiver 264 communicates with base stations (cell sites) to send or receive messages. The transceiver 264 may be a component adapted to communicate via a long range radio protocol such as Global System of Mobile (GSM) communication, a Code Division Multiple Access (CDMA) communication, a Universal Mobile Telecommunications System (UMTS) communication, General Packet Radio Service (GPRS), third-generation (3G) mobile communication, High Speed Download Packet Access (HSDPA), and Worldwide Interoperability for Microwave Access (WiMAX).

The radio processor 260 is coupled to the transceiver 264 to process messages to be sent via the transceiver 260 or radio signals received via the transceiver 264.

The short-range radio module 218 may be a wireless communication module including, among other modules, Bluetooth transceiver and Wireless Fidelity (WiFi) component. The short-range radio module 218 establishes the communication channel 122 with the paired computing device 150. The status data of the mobile computing device 120 is transmitted to the paired computing device 150 via the short-range radio module 218.

The display module 230 displays screen images associated with various operations of the mobile computing device. The display module 230 may be implemented using various display technology including, among other technologies, liquid crystal display (LCD), segment display (e.g., seven-segment or fourteen-segment display), organic light-emitting diode (OLED) and bistatic displays (e.g., electronic ink).

Figure 3:
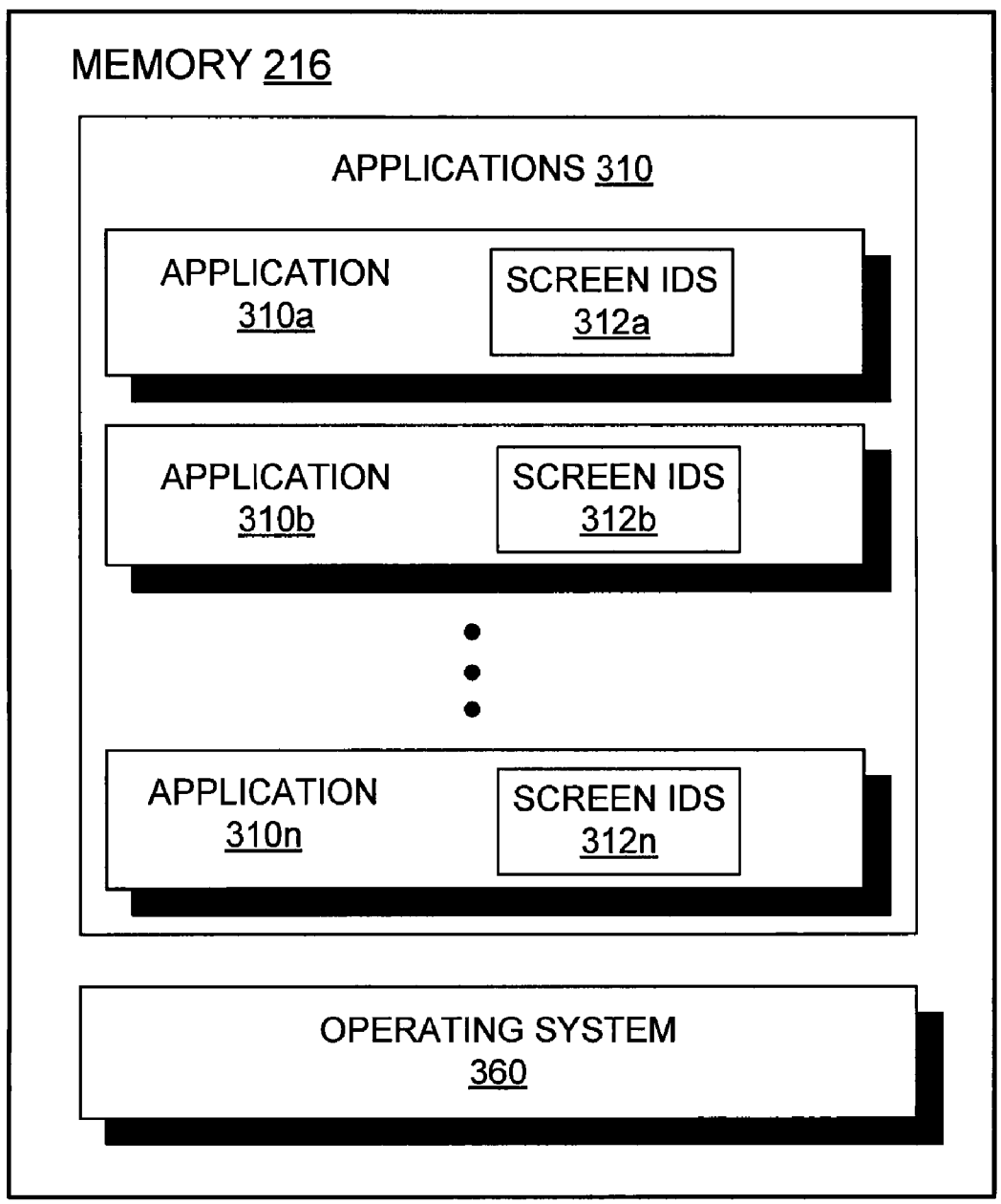
FIG. 3 is a diagram illustrating data stored in the memory module of the mobile computing device of FIG. 2, according to one embodiment.

FIG. 3 is a diagram illustrating data stored in the memory module 216 of the mobile computing device 120 of FIG. 2, according to one embodiment. The memory module 216 stores, among other data, data associated with an operating system 360 and the application programs 310a-n (hereinafter collectively referred to as the application programs 310). The operating system 360 manages the sharing of resources of the mobile computing device 120.

The application programs 310 allow the user to perform various tasks using the mobile computing device 120. The application programs include, among other programs, video and music players (e.g., Pocket Tunes, Kinoma, Windows Media Player, RealPlayer, iTunes, PowerDVD, QuickTime, and Winamp), web browsers (e.g., NetFront, Microsoft Internet Explorer, Mozilla Firefox, and Apple Safari), image viewers (e.g., VD Image Viewer, and ADCSee), document viewers (e.g., Adobe Acrobat), and word processor applications (e.g., Documents To Go, Microsoft Word, and WordPerfect).

In one embodiment, each application program 310a-n includes screen identification data 312 (the screen identification data 312a to 312n are hereinafter collectively referred to as the screen identification data 312) for identifying the screen image associated with the application program 310. The screen identification data 312 associated with the current status of the application program 310 is sent to the paired computing device 150 as part of the status data via the short-range radio module 218.

In another embodiment, the operating system 360 may send the dynamic status data of the mobile computing device 120 or the application programs 310a-n to the paired computing device 150. The dynamic status data is generated by the operating system to indicate the current status of the mobile computing device 120 other than the screen identification data 312, and includes, among other data, the data on the identify of the application programs 310a-n currently running on the mobile computing device, resources available on the mobile computing device 120, the data indicating the states of the application, current configuration parameters of the mobile computing device 150 or the application programs 310a-n.

Example Paired Computing Device

Figure 4:
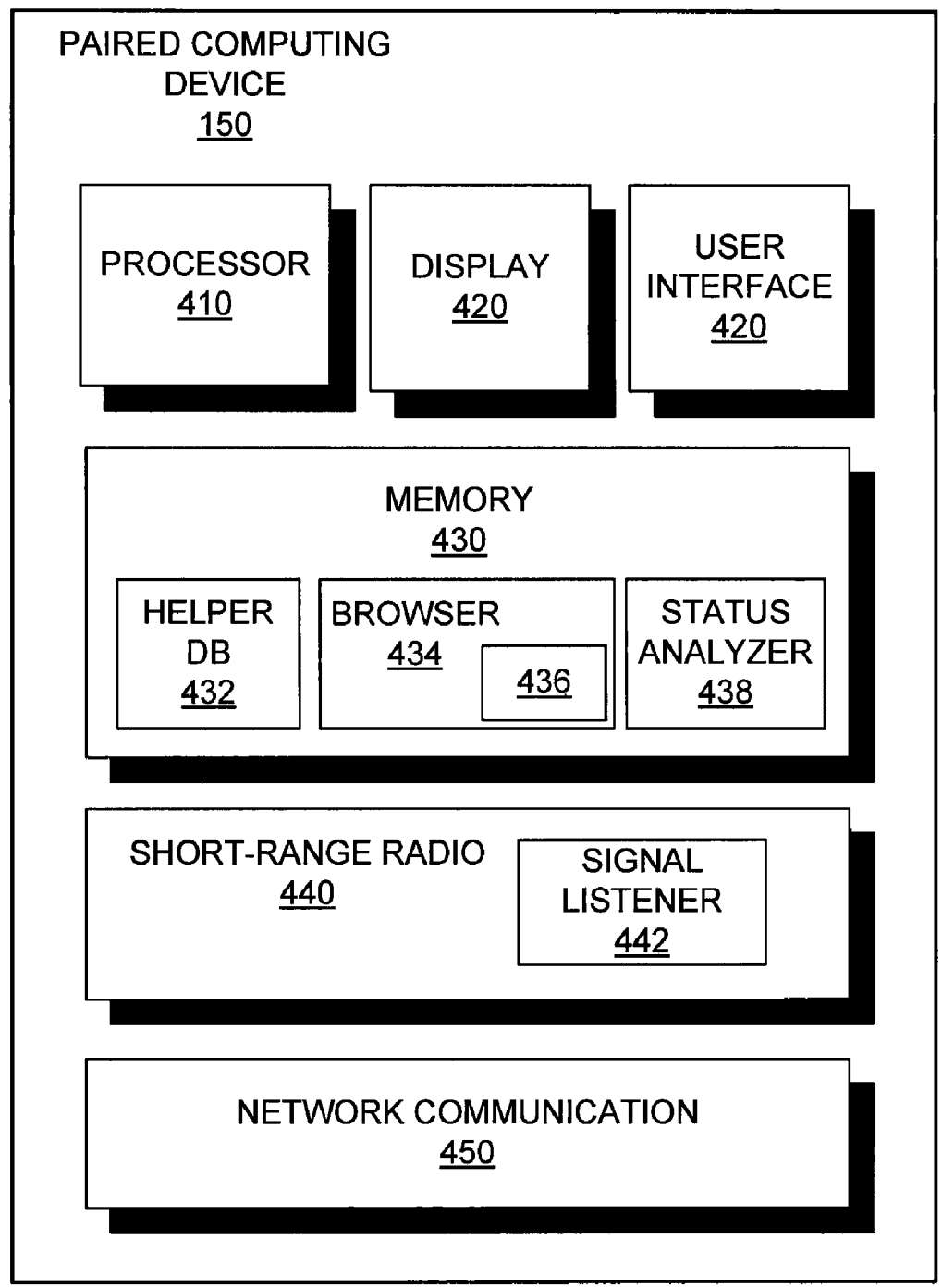
FIG. 4 is a block diagram illustrating a paired computing device, according to one embodiment.

FIG. 4 is a block diagram illustrating a paired computing device 150, according to one embodiment. The paired computing device 150 includes, among other components, a processor 410, a display module 420, a user interface module 420, a memory module 430, a short-range radio module 440, and a network communication module 450. Each component of the paired computing device 150, whether alone or in combination with other components, may be implemented for example, in software, hardware, firmware or any other combination thereof.

The processor 410 performs various operations according to the program codes stored in the memory module 430. The operations performed include, among other instructions, controlling of other components in the paired computing device 150.

The display module 420 displays various images associated with the operation of the paired computing device 150. In one embodiment, the display module 420 has a screen size larger than the display module 230 of the mobile computing device 120. The display module 420 may have screen size sufficient to display the help information associated with the current status of the mobile computing device 120 as well as the current screen image of the mobile computing device 120, as described below in detail with reference to FIGS. 6 and 7.

The memory module 430 (or other tangible computer readable medium) stores program codes (e.g., instructions) to be executed by the processor 150 including, but not limited to, data associated with helper database 432, a browser 434, and a status analyzer 438. The memory module 430 may be a non-volatile type persistent memory such as a hard disk, a compact flash, or an EEPROM. The memory module 430 may also be a volatile type such as a random access memory, a buffer, a cache, a register, a combination of non-volatile and volatile memory, or other device capable of storing instructions and data.

The helper database 432 stores the help information associated with the operation of the mobile computing device 120. In one embodiment, the help information for the status data may be searched and retrieved from the helper database 432. The helper database 432 may be indexed by the status data to efficiently search for the help information associated with the status data sent from the mobile computing device 120.

In one embodiment, the memory module 430 stores data for the browser 434 to allow the user to conveniently access the help information on the paired computing device 150. The browser 434 includes, for example, Internet Explorer, Mozilla Firefox, Safari, Opera, and Netscape. The browser 434 generates and formats various pages including, among other pages, pages including the help information.

The browser 434 may include a plug-in 436 that identifies the help information to be displayed. In one embodiment, the plug-in 436 determines the associated help information. The plug-in 436 may operate in conjunction with the status analyzer 438 to identify the associated help information and then operate in conjunction with the help database 432 to retrieve the relevant help information from the help database 432. The browser 434 may also operate in conjunction with the network communication module 450 to retrieve the help information from the remote server 140. In one embodiment, the plug-in 436 sends data to the remote server 140 so that the remote server 140 may identify and send the associated help information to the paired computing device 150. After the help information is retrieved from either the help database 432 or the remote server 140, the browser 434 converts the help information into a page format including text, images, sound or combination thereof that can be accessed by the user via user interface module such as the display module 420 of the paired computing device 150.

In one embodiment, the web page format includes hyperlinks that link to different pages that provide additional help information. After receiving the screen identification data 312 that indicates the change in the screen image displayed on the mobile computing device 120, the browser 434 (i.e., the plug-in 436) automatically displays the help information associated with the application state.

The status analyzer 438 analyzes the dynamic status data from the mobile computing device 120 to determine currents status of the mobile computing device 120. The status analyzer 438 may operate in conjunction with the browser 434 and the helper database 432 to provide relevant help information to the user. For example, the status analyzer 438 may provide information to the use via the browser 434 that there is an application program already installed on the mobile computing device 120 that conflicts with the application program that is currently being installed, or that there is insufficient resource in the mobile computing device 120 to install the application program. The helper database 432 may further include information on how to resolve such issues, which may be retrieved by the browser 434 for displaying to the user.

The short-range radio module 440 of the paired computing device 150 is a counterpart module of the short-range radio module 218. The mobile computing device 120 and the paired computing device 150 communicate via the short-range radio module 440 and the short-range radio module 218. In one embodiment, the short-rage radio 440 includes, among other components, a signal listener 442. The signal listener 442 detects signals from the mobile computing device 120. The paired computing device 150 may remain in a sleep mode that consumes minimal amount of power when a short-range radio signal (e.g., Bluetooth signal) of the mobile computing device 120 is not detected by the signal listener 442. After the signal listener 442 detects the short-range radio signal from the mobile computing device 120, the signal listener 442 wakes up the paired computing device 150 so that the paired computing device 150 becomes fully operational. By waking up the paired computing device 150 after detecting the short-range signal from the mobile computing device 120, the power consumption of the paired computing device 150 is reduced.

The network communication module 450 is a communication module that allows the paired computing device 150 to communicate with devices coupled to the network 130 including, among others, the remote server 140. The network communication module 450 is, for example, a WiFi network card or an Ethernet network card.

Method of Providing Help Information on Paired Computing Device

Figure 5A:
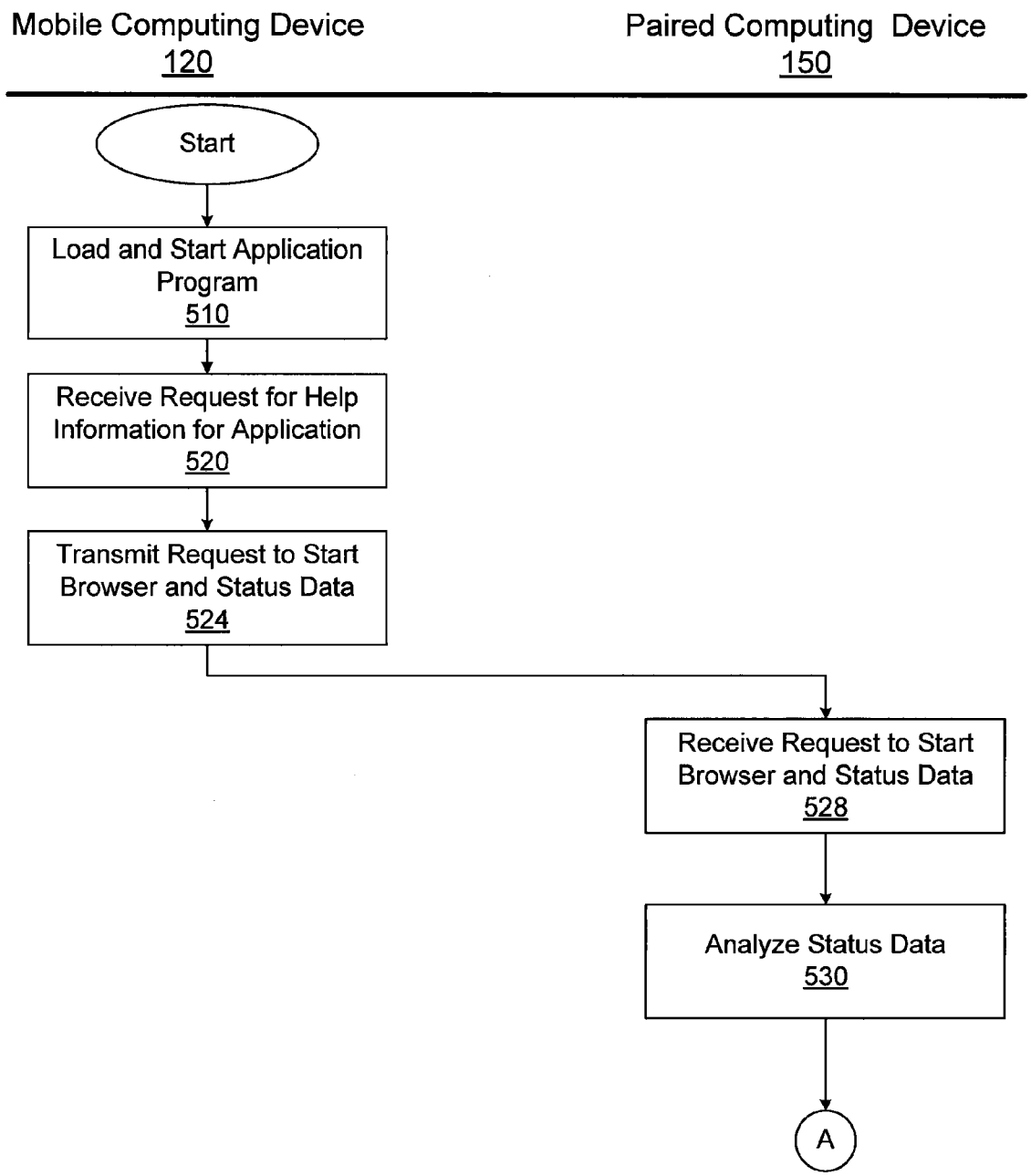
FIGS. 5A and 5B are flowcharts illustrating a method of providing help information associated with a mobile computing device on a paired computing device, according to one embodiment.
Figure 5B:
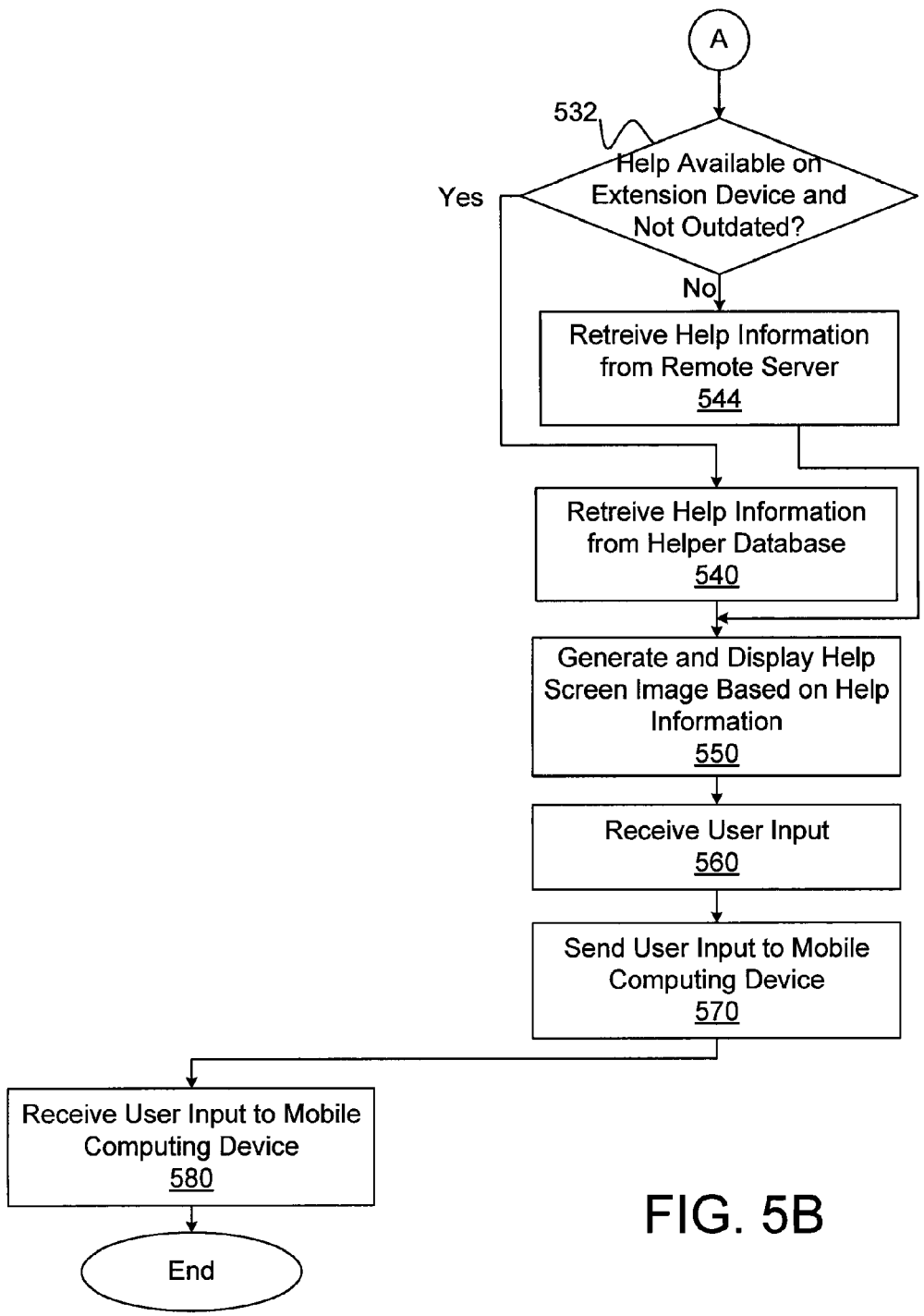

FIGS. 5A and 5B are flowcharts illustrating a method of providing help information associated with the mobile computing device 120 on the paired computing device 150, according to one embodiment. First, an application program is loaded and started 510 on the mobile computing device 120. After receiving 520 a user input requesting the help information on the mobile computing device 120, the mobile computing device 120 transmits 524 the status data and a request to start the browser via the communication channel 122 to the paired computing device 150.

Then the paired computing device 150 receives 528 the status data and the request to start the browser. The paired computing device 150 analyzes 530 the status data to determine the help information to be displayed on the browser. Then the paired computing device 150 determines 532 whether the help information for the status data is available from its helper database 432 and whether the help information in the helper database 432 is not outdated. If it is determined that the help information corresponding to the status data is available from the helper database 432 and is not outdated, then the paired computing device 150 retrieves 540 the help information from the helper database 432. Then the process proceeds to generate and display 550 a help screen image based on the retrieved help information.

If it is determined in step 530 that the help information is not available from the helper database 432 or is outdated, then the paired computing device 150 retrieves 544 the help information from the remote server 140 via the network 130. Then the process proceeds to generate and display 550 a help screen image based on the retrieved help information. By automatically retrieving the help information from the paired computing device 150 and updating the outdated help information, the user need not take other steps to obtain the help information from other sources or confirm whether the stored help information is outdated.

If there is any user input associated with the help information that needs to be provided to the mobile computing device 120, the paired computing device 150 receives 560 the user input for the mobile computing device 120. The mobile computing device 120 generally has user interfaces such as a small screen or small keypads that are inconvenient to input information to the mobile computing device 120. In contrast, the paired computing device 150 may have user interfaces such as a full keyboard and a mouse along with a larger screen to display a much larger screen to allow the user to view more information at once and input the information more conveniently. After receiving the user input, the paired computing device 150 sends 570 the received user input to the mobile computing device 120.

After receiving 580 the user input from the paired computing device 150, the process terminates.

Example Help Information Screen

Figure 6:
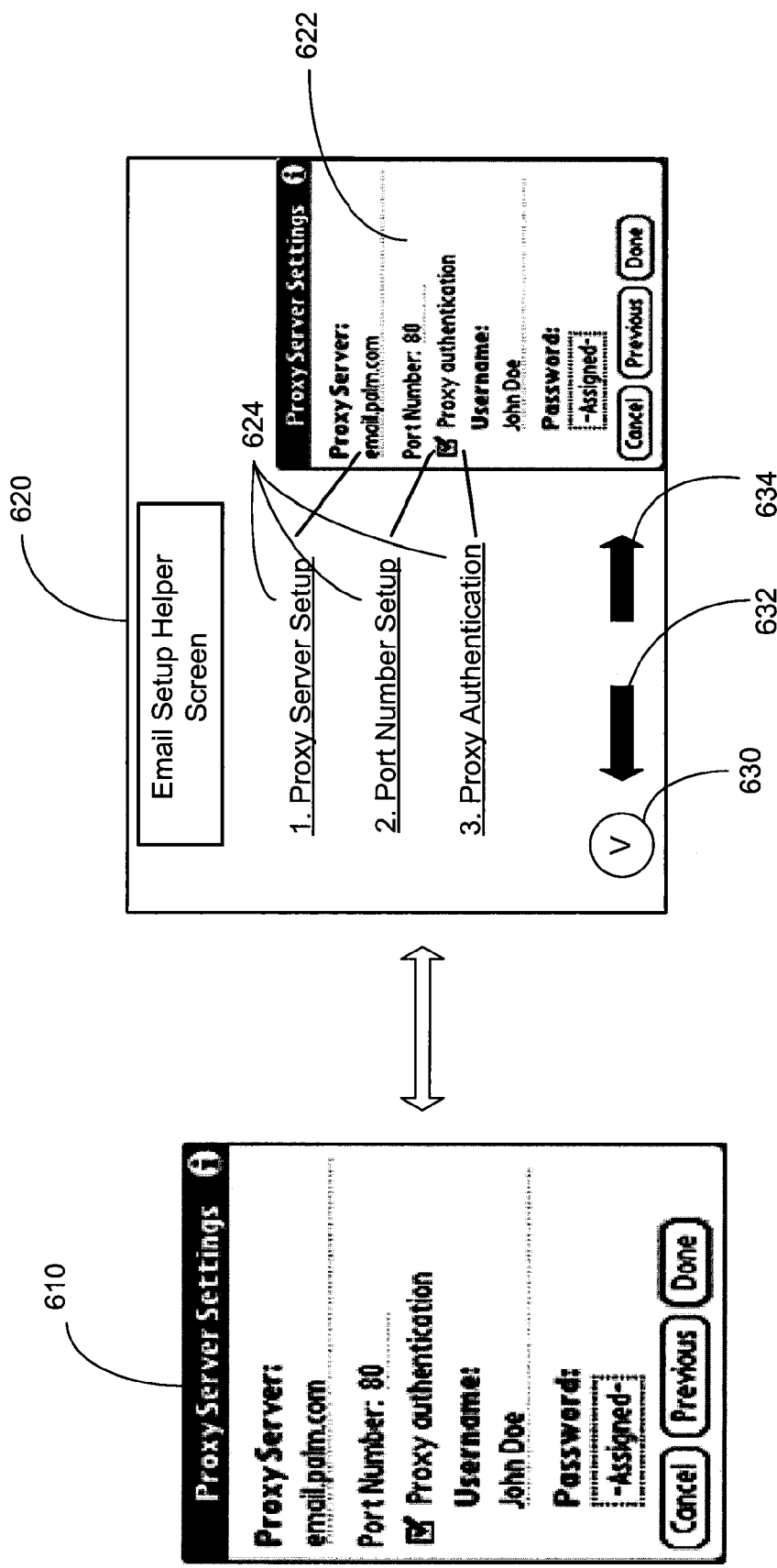
FIG. 6 is example screen shots of a mobile computing device and a paired computing device, according to one embodiment.

FIG. 6 is screen shots of a mobile computing device 120 and a paired computing device 150, according to one embodiment. The screen shots of this example relate to configuring of an email application program installed on the mobile computing device 120. The screen image 610 of the mobile computing device 120 is one of a series of screen images displayed on the mobile computing device 120 for configuring the email application program. The screen image 610 includes, among others, text boxes or check boxes for identifying a proxy server, a port number, a username, and a password associated with an email account.

The paired computing device 150 displays a helper screen image 620 including hyperlinks 624, the current screen image 622 of the mobile computing device 120, a voice instruction icon 630, a backward icon 632 and a forward icon 634. When the user clicks on one of the hyperlinks 624, the paired computing device 150 displays screen images providing detailed information on respective entries (i.e., proxy server setup, port number setup, and proxy authentication) required to set up the email account. The current screen image 622 shows the current screen image displayed on the mobile computing device 120. By displaying the current screen image 622, the user may easily identify the hyperlinks associated with each entry in the screen image of the mobile computing device 120.

The voice instruction icon 630 replays voice instructions that interactively explain the entries in the current screen image 622. By clicking the backward icon 632 or the forward icon 634, the user may navigate to a previous or subsequent helper screen image.

In this example, the user inputs necessary entries in the mobile computing device 120 using its user interface (e.g., a touch screen or keypads). As the user proceeds to a different configuration screen on the mobile computing device 120, the paired computing device 150 automatically detects changes in the configuration screen using the status data (e.g., the screen identification data 312), and changes the helper screen image 620 accordingly.

Figure 7:
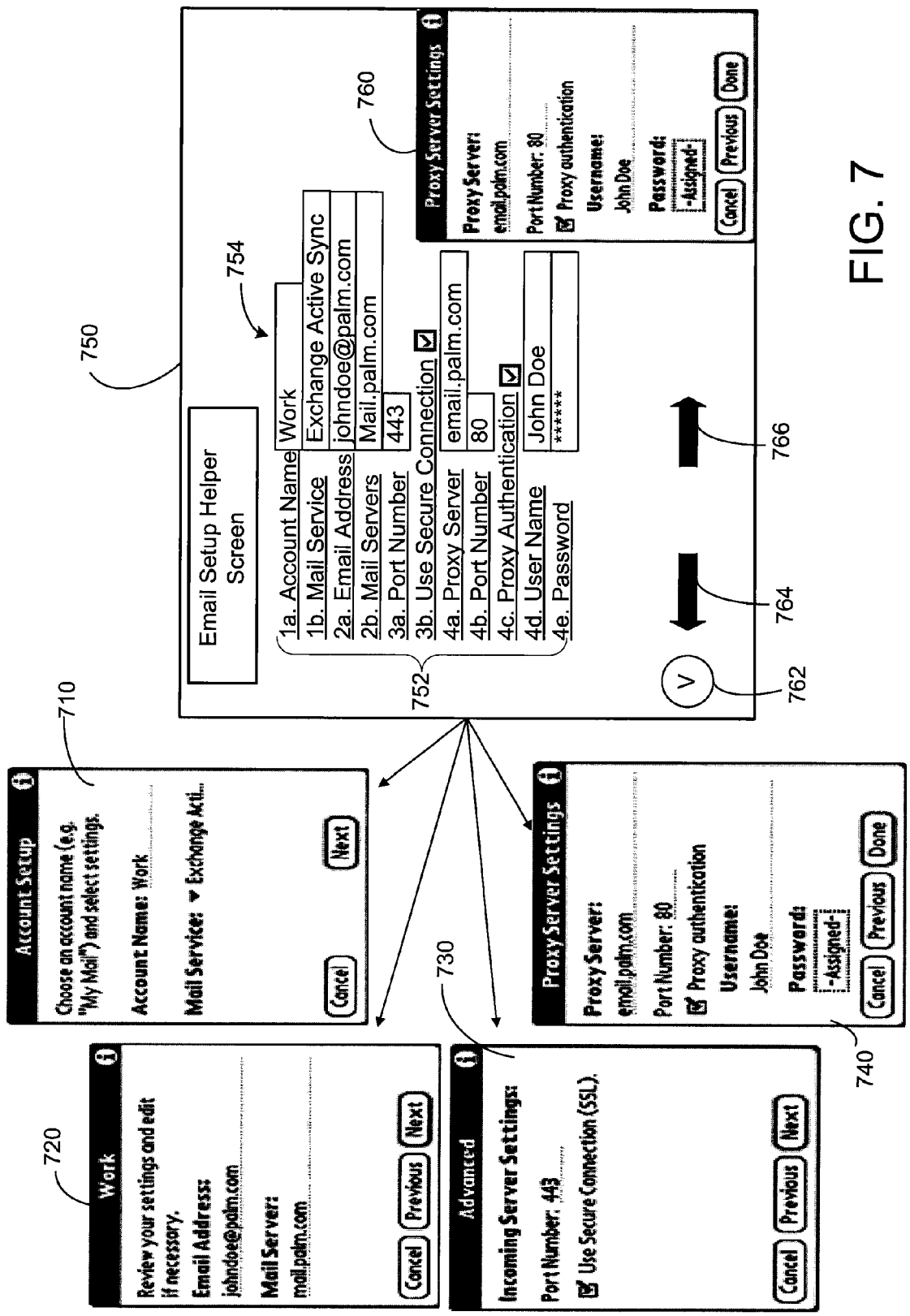
FIG. 7 is example screen shots of a mobile computing device and a paired computing device, according to another embodiment.

FIG. 7 is screen shots of a mobile computing device 120 and a paired computing device 150, according to another embodiment. This example is also related to configuring the email program installed on the mobile computing device 120, but differs from the example of FIG. 6 in that the user inputs for configuring the email program is provided to the paired computing device 150 instead of the mobile computing device 120.

The helper screen image 750 displayed on the paired computing device 150 displays entries associated with multiple screen images of the mobile computing device 120. Specifically, the helper screen image 750 displays entries and information associated with four screen images 710 to 740 of the mobile computing device 120 that is displayed in sequence during the configuration of the email application program.

The helper screen image 750 of the paired computing device 150 includes hyperlinks 752 to other helper screen images associated with the entries, text boxes or pull-down menus 754 for providing the user inputs, the current screen image 760 of the mobile computing device 120, a voice instruction icon 762, a backward icon 764, and the forward icon 766. As in the example of FIG. 6, the help information associated with the entry is displayed on the helper screen image 750 when the hyperlinks 752 are clicked. The functions of voice instruction icon 762, the current screen image 760, the backward icon 764, and the forward icon 766 are the same as described above in detail with reference to FIG. 6.

The helper screen image 750 is different from the help screen image 620 of FIG. 6 in that the helper screen image includes text boxes or pull-down menus 764 for receiving the user input using the paired computing device 150. In one embodiment, as the user progresses to input configuration information in the text boxes or pull-down menus 754, the screen image displayed on the mobile computing device 120 changes accordingly. For example, after the user enters choices for '1*b*. Mail Service' and proceeds to enter choices for '2*a*. Email Address,' the screen image displayed on the mobile computing device 120 changes from the screen image 710 to the screen image 720 that is associated with the entry for '2*a*. Email Address.' Such synchronized display may be achieved by sending a synchronization signal from the paired computing device 150 to the mobile computing device 120 indicating that the entry for a different screen image (i.e., the screen image 720) is being provided by the user. The current screen image 760 may also be changed accordingly to show the screen image 720. In another embodiment, the screen images 710-740 displayed on the mobile computing device 120 are not synchronized with the images on the helper screen image 750. For example, the mobile computing device 120 may display only one or some of the screen images 710-740 and then proceeds to display that the configuration of the mobile computing device 120 is complete. That is, the images on the helper screen image 750 are asynchronous with the images on the mobile computing device 120.

After the user makes the choices and provides inputs via the paired computing device 150, the paired computing device 150 sends data of the choices and inputs regarding the configuration of the email application program to the mobile computing device 120 via the short-range radio module 440.

The screen shots of FIGS. 6 and 7 are merely illustrative and various other screen configurations may be used. For example, the hyper links 624, 752 may be omitted and be replaced with text regarding detailed information provided below the title of each entry. Also, the current screen image 622, 760 may also be omitted or be replaced with other graphical representations.

Alternative Examples

In one embodiment, the paired computing device 150 does not include a separate network communication module 450. The paired computing device 150 communicates with the network 130 via the mobile computing device 120. This alternative embodiment may be advantageous because the components in the paired computing device 150 are reduced, simplifying the paired computing device 150 and decreasing the cost of the paired computing device 150.

In one embodiment, the mobile computing device 120 and the paired computing device 150 do not include short-range radio modules 218, 440. Instead, the communication of the mobile computing device 120 and the paired computing device 150 is established using long range radio or cables (e.g., USB cables).

In one embodiment, the paired computing device 150 searches and retrieves the help information from more than one remote server. If the help information requested by the user is not found in one remote server, the paired computing device 150 communicates with another remote server to retrieve the help information. By searching and finding the help information in more than one remote servers, more exhaustive help information can be gathered by the paired computing device 150 with minimal or no user intervention.

As noted above, embodiments may be configured as software elements or modules. The software may be written or coded using a programming language. Examples of programming languages may include C, C++, BASIC, Perl, Matlab, Pascal, Visual BASIC, JAVA, ActiveX, assembly language, machine code, and so forth. The instructions may include any suitable type of code, such as source code, object code, compiled code, interpreted code, executable code, static code, dynamic code, and the like. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application programming interfaces (API), instruction sets, computing code, computer code, code segments, computer code segments, words, values, symbols, or any combination thereof. The embodiments are not limited in this context.

Some embodiments may be implemented, for example, using any tangible computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

By displaying help information associated with the operation of a mobile computing device on a paired computing device in a synchronized manner, the user need not switch between the windows or screen images to search and locate the help information. Therefore, the use of the application program on the mobile computing device is not interrupted by invoking the helper system. Further, the help information displayed on the paired computing device is generated based on the status data sent from the mobile computing device. Therefore, the help information provided is contextual to the current operation of the mobile computing device. Further, the paired computing device may include a large screen that allows the user to view more detailed help information or screen shots of the mobile computing device to facilitate the user to operate the mobile computing device or the application programs. The large screen of the paired device may also allow users to display fields (e.g., text boxes or pull-down menus) that allow the user to conveniently provide user inputs associated with the mobile computing device using the user interface modules of the paired computing device.

Upon reading this disclosure, those of skill in the art will appreciate still additional alternative structural and functional designs for a system and a process for a providing help information through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present embodiments disclosed herein without departing from the spirit and scope of the invention as defined in the appended claims.

What is claimed is:

1. A mobile computing device comprising:
 a first user interface module for interacting with a user of the mobile computing device and configured to receive a user input indicating a request for help information;
 a memory module for storing data associated with operation of one or more programs, the data comprising a status data representing a status of the first user interface module associated with running of one or more programs on the mobile computing device; and
 a communication module operably coupled to the memory module, the communication module configured to send the status data to a paired computing device configured to operate in conjunction with the mobile computing device and send updated status data to the paired computing device responsive to a change in the operation of the one or more programs in the first user interface, the paired computing device comprising a second user interface configured to display on a display of the paired computing device help information that is synchronized with the status of the first user interface module of the mobile computing device.

2. The mobile computing device of claim 1, wherein the first user interface module comprises a first display device having a first display size, and the second user interface module comprises a second display device having a second display size, the second display size larger than the first display size, and the second display device being the display of the paired computing device.

3. The mobile computing device of claim 2, wherein the status data comprises screen identification data for identifying screen images displayed on the first display device.

4. The mobile computing device of claim 2, wherein the second display device displays the help information for the images displayed on the first display device.

5. The mobile computing device of claim 1, wherein the communication module receives user inputs associated with the program via the paired computing device.

6. The mobile computing device of claim 1, wherein the communication module is a Bluetooth module.

7. A computing device paired with a mobile computing device for providing help information associated with operation of the mobile computing device, the computing device comprising:
 help data storage for storing the help information associated with one or more programs executable on the mobile computing device;
 a communication module for receiving status data from the mobile computing device, the status data identifying a status of a first user interface module of the mobile computing device associated with execution of the one or more programs on the mobile computing device;
a display; and
a second user interface module associated with the help data storage and the communication module, the user interface module displaying on the display the help information that is synchronized with the status of the first user interface module of the mobile computing device.

8. The computing device of claim 7, wherein the first user interface module comprises a first display device having a first display size, and the second user interface module comprises a second display device having a second display size, the second display size larger than the first display size, the second display device being the display of the computing device.

9. The computing device of claim 8, wherein the status data comprising screen identification data for identifying screen images displayed on the first display device.

10. The computing device of claim 8, wherein the second display device displays a screen image displayed on the first display device.

11. The computing device of claim 7, wherein the communication module sends to the mobile computing device user inputs associated with a program running on the mobile computing device.

12. The computing device of claim 7, wherein the communication module is a Bluetooth module.

13. The computing device of claim 7, further comprising:
a browser associated with the second user interface to render a screen image to be displayed on the second user interface; and
a plug-in associated with the browser and the help data storage, the plug-in controlling the browser to display the help information synchronized with a screen image displayed on the first user interlace.

14. A method of providing help information for operating a mobile computing device, the method comprising:
receiving a status data identifying a status of a first user interface module of the mobile computing device at a computing device paired with the mobile computing device;
retrieving help information associated with the status data at the paired computing device;
displaying the help information corresponding to the status data on a second user interface module of the paired computing device; and
updating the help information displayed on the second user interface module responsive to receiving the status data indicating change of the status of the first user interface.

15. The method of claim 14, wherein updating the help information is performed in-real time with the change in the status of the first user interface.

16. The method of claim 14, wherein the status of the first user interface comprises screen images displayed on a display device of the mobile computing device.

17. The method of claim 14, further comprising:
at the paired computing device, receiving user inputs associated with configuration of the mobile computing device; and
sending the received user input from the paired computing device to the mobile computing device.

18. The method of claim 14, further comprising:
querying help information storage in the paired computing device for help information corresponding to the status data; and
responsive to not finding the help information corresponding to the status data in the help information storage, retrieving the help information from a remote server.

19. A non-transitory computer readable medium configured to store instructions executable by a processor, the instructions when executed by the processor cause the processor to:
receive a status data identifying a status of a first user interface module of the mobile computing device at a computing device paired with the mobile computing device;
retrieve help information associated with the status data at the paired computing device;
display the help information corresponding to the status data on a second user interface module of the paired computing device; and
update the help information displayed on the second user interface module responsive to receiving the status data indicating change of the status of the first user interface.

* * * * *

UNITED STATES PATENT AND TRADEMARK OFFICE
CERTIFICATE OF CORRECTION

PATENT NO. : 8,311,585 B2  
APPLICATION NO. : 11/864411  
DATED : November 13, 2012  
INVENTOR(S) : Kam Stewart Page 1 of 1

It is certified that error appears in the above-identified patent and that said Letters Patent is hereby corrected as shown below:

In column 13, line 36, in Claim 13, delete "interlace." and insert -- interface. --, therefor.

Signed and Sealed this  
Twelfth Day of March, 2013

Teresa Stanek Rea  
*Acting Director of the United States Patent and Trademark Office*